May 12, 1936.   H. T. CHANDLER   2,040,293
PISTON
Filed May 12, 1934
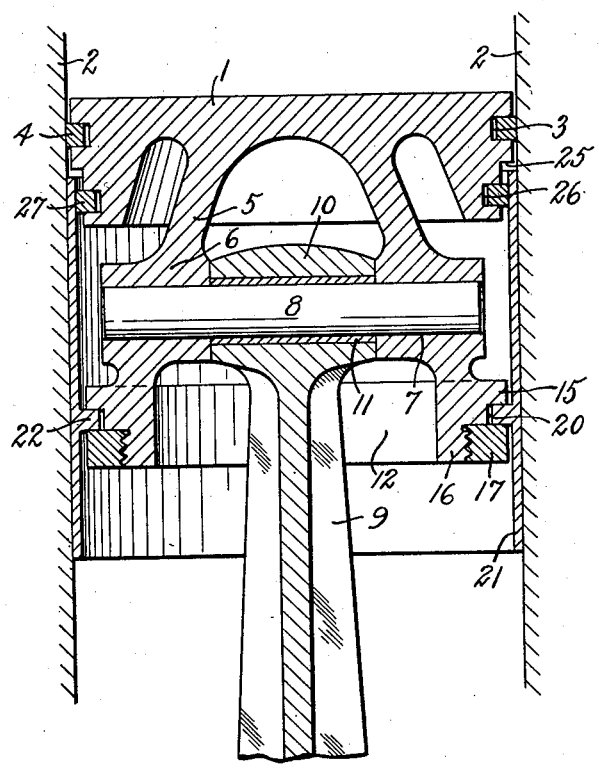
INVENTOR
HENRY T. CHANDLER
BY
ATTORNEY Patented May 12, 1936

2,040,293

UNITED STATES PATENT OFFICE 2,040,293

PISTON

Henry T. Chandler, New York, N. Y.

Application May 12, 1934, Serial No. 725,276

12 Claims. (Cl. 309—15)

This invention relates to pistons and more particularly to pistons adapted for use in internal combustion engines.

In engines of the above type maintenance of proper piston clearance, cooling, piston weight, and wear of the cylinder walls present major problems which are well known to persons skilled in the art. An object of the present invention is to provide a piston having characteristics which take all of the above problems into consideration. Other objects are; to provide a light weight piston which is cheap and simple to construct and assemble, which maintains a minimum clearance at all operating temperatures, which facilitates lubrication of the cylinder walls and which minimizes wear of the walls.

Various other objects and advantages will be apparent as the nature of the invention is more fully disclosed.

Although the novel features which are believed to be characteristic of this invention will be pointed out more particularly in the claims appended hereto, the invention itself as to its objects and advantages and the manner of its operation may be better understood by referring to the following description taken in connection with the accompanying drawing, in which a preferred embodiment thereof is disclosed for purposes of illustration only.

In the drawing the figure is a longitudinal section of a piston constructed in accordance with the present invention.

Referring to the drawing more in detail the piston is shown as comprising a head 1 which may be formed of comparatively light metal such as aluminum and which may have a comparatively high coefficient of expansion with respect to the metal of the cylinder walls. The piston head 1 is adapted to operate between cylinder walls 2 and may be provided with one or more grooves 3 in which rings 4 are seated, said rings being adapted to perform the usual functions of piston rings which are well known in the art. The head 1 is also provided with downwardly extending supporting members such as struts 5 having bosses 6 which are suitably enlarged and provided with bores 7 to receive a connecting rod pin 8. A connecting rod 9 of the usual construction may be provided with a head 10 having a bearing 11 in which the pin 8 is seated. The pin 8 may be secured to either the struts 5 or to the head 10 of the connecting rod 9 as may be desired. In the form shown the pin 8 is adapted to be rigidly secured in the struts 5 and the bearing 11 permits pivotal movement of the piston rod 9 with respect thereto.

The struts 5 may extend downwardly past the bosses 6 and may carry a ring 12 having shoulders 15 and flange 16 on which a retaining ring 17 is threaded. The retaining ring is spaced from the shoulders 15 to form a groove 20 for the purpose to be described.

The piston is provided with a separate, cylindrical skirt or sleeve 21, which may be formed of the same material as the cylinder walls or of a material having characteristics similar thereto, for example, of cast iron. The skirt 21 is adapted to be positioned in close contact with the walls, for example, with a clearance of the order of .003 inch, and is provided with an internal rib 22 which is seated in the groove 20 between the shoulder 15 and the retaining ring 17. The rib 22 is clamped between the shoulder 15 and the retaining ring 17 against relative longitudinal movement but may be sufficiently free to permit relative radial movement in response to differential expansion of the skirt 21 and the head 1 and to permit relative circumferential movement of the strut for seating purposes. Sufficient clearance is provided between the shoulder 15 and the skirt 21 and between the rib 22 and the groove 20 for this purpose. The rib 22 thus acts as a guide for the head. The struts 5 have sufficient leverage to limit the rocking movement of the head without constraining the parts against independent expansion.

The skirt 21 extends axially above and below the rib 22 and is free to expand longitudinally as well as radially, independently of the expansion of the cylinder head. The upper part of the skirt 21 overlaps a part of the head 1 which is provided with a recess 25 to receive the same and with a groove 26 in which a sealing ring 27 is seated. The ring 27 is adapted to bear against the inner surface of the skirt 21 so as to maintain a tight seal therewith and to act as a second guide for the head.

The skirt forms in effect a large piston ring or sleeve having a small clearance whereby a tight seal is maintained due to the oil film between the skirt and the cylinder wall. Heat is transmitted through the struts 5 and the ring 12 to the skirt 21 and thence to the cylinder wall. Due to the large area of contact between the skirt and the cylinder wall, the transfer of heat is facilitated and the skirt remains at substantially the same temperature as the cylinder wall. Inasmuch as the skirt has practically the same coefficient of expansion as the wall it is obvious that the clearance will be maintained uniform regardless of the operating temperature.

The rings 4 prevent oil from passing to the top of the cylinder head 1. The aluminum head may be formed with a comparatively large clearance inasmuch as the seal is not effected thereby and the skirt acts as a guide to prevent the head from slapping or rocking against the cylinder walls, such clearance being essential in order to permit the relatively great expansion of the head to take place due to the various temperature changes which occur during operation. The skirt is sufficiently thin to readily conform to a cylinder which has become slightly oval and is free to find its best seating position. The symmetrical formation of the skirt eliminates all tendency to warp into non-circular form. The thin skirt and aluminum head provide a particularly light construction. The maintenance of the pistons and cylinder walls is simplified inasmuch as the entire skirt may be readily removed and renewed when desired.

It is obvious that the location of the flange 22 may be changed and that the skirt 21 may be secured to the struts 5 by any suitable means. A preferred means has been shown for purposes of illustration only. Also, the ring 12 may be variously located and may be formed integral with the struts 5 or may be secured thereto as desired. In certain instances this ring may be discontinuous or may be coextensive with the struts.

Although a few of the operating advantages of the invention have been outlined above, various others will be readily apparent to a person skilled in the art. It is to be understood that various changes and modifications may be made without departing from the scope of the invention which is only to be limited in accordance with the following claims when interpreted in view of the prior art.

What is claimed is:

1. A two part piston comprising a head carrying bosses adapted to receive a connecting rod pin and a separate skirt having a different coefficient of expansion external to said head, a first guide means effecting a fluid seal between said head and said skirt, a second guide means spaced axially therefrom to provide therewith a two point support for said skirt adapted to limit pivotal movement of said head therein, both of said guide means comprising frictionally held members having clearance with the head adapted to permit independent expansion of said parts, one only of said guide means having means to secure said parts against relative longitudinal movement whereby differential longitudinal expansion of said parts is permitted.

2. A two part piston comprising a head having depending struts carrying bosses adapted to receive a connecting rod pin and a separate skirt having a different coefficient of expansion external to said head, a first guide means effecting a fluid seal between said head and said skirt, a second guide means associated with said struts below said bosses to provide with said first guide means a two point support for said skirt adapted to limit pivotal movement of said head therein, both of said guide means comprising frictionally held members having clearance with the head adapted to permit independent expansion of said parts and to permit free rotation of said skirt for seating in a cylinder, one only of said guide means having means to secure said parts against relative longitudinal movement whereby differential longitudinal expansion of said parts is permitted.

3. A two part piston comprising a head having depending struts carrying bosses adapted to receive a connecting rod pin and a separate skirt having a different coefficient of expansion overlapping at least a part of said head, means effecting a fluid seal between said part and said skirt, means associated with said struts below said bosses to engage said skirt, said first and second means effecting a two point support for said skirt adapted to limit pivotal movement of said head therein, both of said means having a clearance relative to the head sufficient to permit independent expansion of said parts, one only of said means having means to secure said parts against relative longitudinal movement whereby differential longitudinal expansion of said parts is permitted.

4. A two part piston comprising a head having depending struts carrying bosses adapted to receive a connecting rod pin and a separate skirt having a different coefficient of expansion overlapping at least a part of said head, means effecting a fluid seal between said part and said skirt, guide means comprising a radial groove in said struts below said bosses, and a cooperating radial flange formed on said skirt, said first and second means providing a two point support for said skirt adapted to limit pivotal movement of said head therein, both of said means having a clearance relative to the head sufficient to permit independent expansion of said parts, said guide means having means to secure said parts against relative longitudinal movement, said sealing means being adapted to permit relative longitudinal movement whereby differential longitudinal expansion of said parts is permitted.

5. A two part piston comprising a head having depending struts carrying bosses adapted to receive a connecting rod pin and a separate skirt having a different coefficient of expansion overlapping at least a part of said head and having sufficient clearance relative to the head to permit independent expansion of said parts, a sealing ring carried by said head and engaging said skirt, an annular member carried by said struts below said bosses and having a radial groove, a flange carried by said skirt and held in said groove against longitudinal movement, said flange being free to rotate or expand independently of said struts, whereby the entire skirt is adapted to seat in a cylinder and whereby said head is constrained for transverse movement within said skirt but is free to expand independently of said skirt.

6. A two part piston comprising a head carrying bosses adapted to receive a connecting rod pin and a separate skirt having a different coefficient of expansion external to said head, means associated with said head to support said skirt at two axially spaced points so as to limit pivotal movement of said head, both of said means comprising frictionally held members having clearance with the head adapted to permit independent expansion of said parts, one only of said means having means to secure said parts against relative longitudinal movement whereby differential longitudinal expansion of said parts is permitted.

7. A two part piston comprising a head having depending struts carrying bosses adapted to receive a connecting rod pin and a separate skirt having a different coefficient of expansion overlapping at least a part of said head to form a